United States Patent [19]

Arway et al.

[11] 4,360,817

[45] Nov. 23, 1982

[54] LOW EVAPORATION INK CATCHER FOR INK JET PRINTING SYSTEM

[75] Inventors: George W. Arway, River Grove; Frank Eremity, Hanover Park, both of Ill.

[73] Assignee: A. B. Dick Company, Chicago, Ill.

[21] Appl. No.: 263,896

[22] Filed: May 15, 1981

[51] Int. Cl.³ .................. G01D 15/18

[52] U.S. Cl. .................. 346/75; 346/140 R

[58] Field of Search .................. 346/75, 140 IJ

[56] References Cited

U.S. PATENT DOCUMENTS

| | | | |
|---|---|---|---|
| 3,761,953 | 9/1973 | Helgeson et al. | 346/75 |
| 3,769,630 | 10/1973 | Hill et al. | 346/75 |
| 3,798,656 | 3/1974 | Lowy et al. | 346/1 |
| 3,936,135 | 2/1976 | Duffield | 346/140 IJ X |
| 4,023,182 | 5/1977 | Arway et al. | 346/75 |
| 4,035,811 | 7/1977 | Paranjpe | 346/140 IJ X |
| 4,184,167 | 1/1980 | Yandervalk | 346/140 IJ X |
| 4,292,640 | 9/1981 | Lammers et al. | 346/140 IJ X |

OTHER PUBLICATIONS

Digital Phase Control for Ink Jet Printing by F. E. Jackson, *IBM Technical Disclosure Bulletin*, vol. 16, No. 6, Nov. 1973.

*Primary Examiner*—George H. Miller, Jr.
*Attorney, Agent, or Firm*—Peter S. Lucyshyn

[57] ABSTRACT

An ink return system for an ink jet printer which directs a portion of the ink projected from a nozzle to a print surface and the remainder to a catcher, the catcher having a receptacle entrance for intercepting the ink stream including a tube with an entrance to catch the ink stream and then convey the ink liquid along a flow path away from the catcher and a cowling adjacent the receptacle connected to a vacuum source to create a scavenging air flow at the tube entrance for ingesting ink mist without exposing the intercepted liquid ink to the relatively high rate of air flow necessary to sweep away the ink mist.

6 Claims, 7 Drawing Figures

FIG. 1
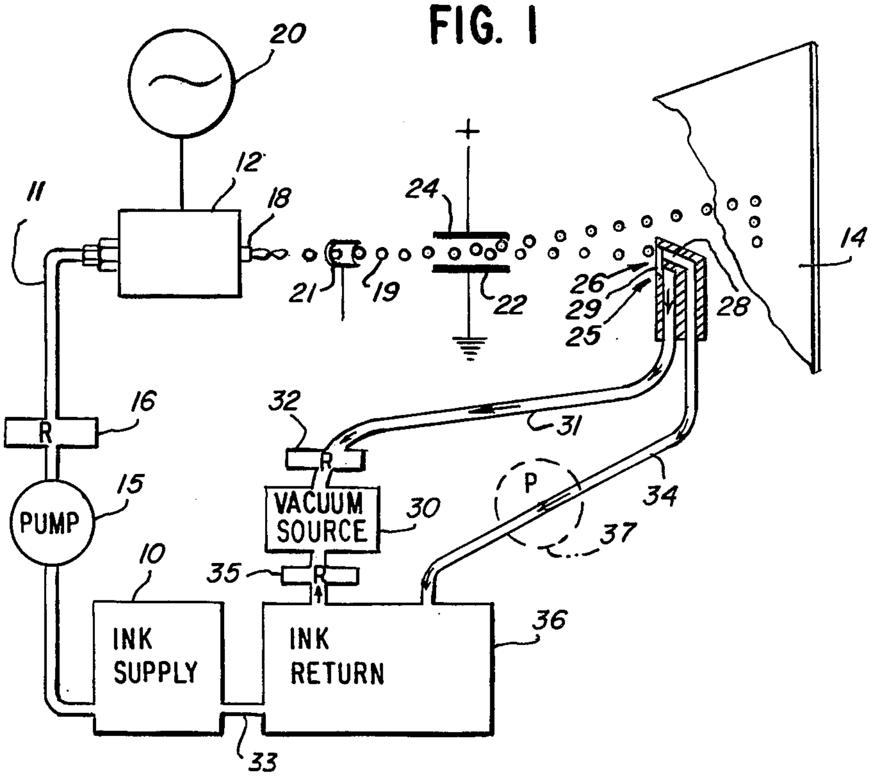
FIG. 2
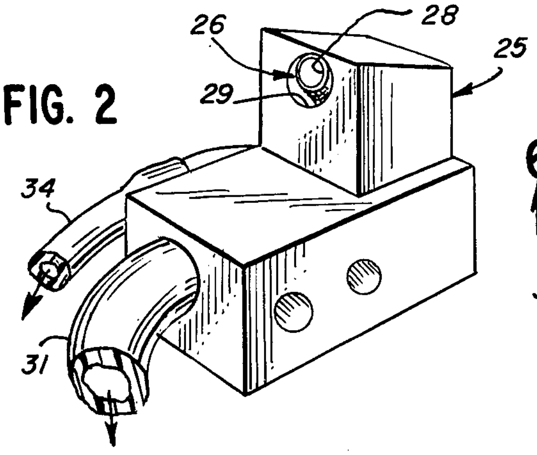
FIG. 5
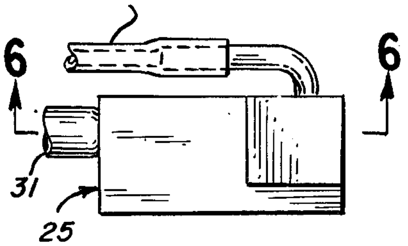
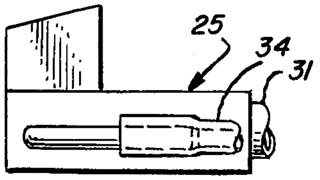
FIG. 3
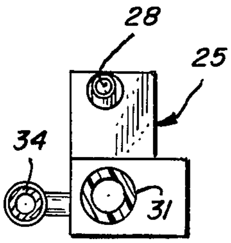
FIG. 4
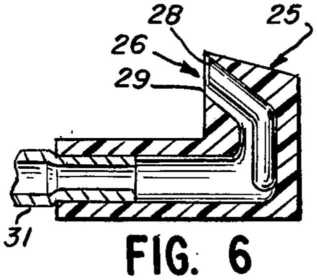
FIG. 6

LOW EVAPORATION INK CATCHER FOR INK JET PRINTING SYSTEM

BACKGROUND OF THE INVENTION

This invention relates generally to ink jet printing apparatus and more particularly to the ink return system for intercepting and recovering the unused ink.

Ink return systems for intercepting and recovering unused ink have been widely utilized in ink jet printing systems. The systems usually include a catcher which initially catches ink and then dumps it into a conduit for eventual return to the ink supply system reservoir to be reused. Ink is scavenged from the catcher entryway by connecting the conduit to a vacuum source. The establishment of a vacuum in the conduit not only draws ink away from the entryway but also draws it through the conduit and into a return tank. The vacuum level is commonly adjusted to a sufficiently high level so that air drawn into the catcher from the surrounding area also draws the ink mist that commonly exists about the catcher into the entryway. It is desirable that the ink mist be pulled into the catcher so as to prevent its deposition either on adjacent components of the printing system or the printing surface.

For certain applications of ink jet printing it is necessary to use inks that are solvent based, for example alcohol or ketone based. These inks suffer relatively high evaporation rates when exposed to air. It is while using those inks and maintaining the high level air flow in the catcher area that solvent evaporation occurs at a rapid rate. The loss of solvent by the ink eventually causes it to become unusable, and then it has to be replaced or reformulated.

To reduce evaporation of solvent in the ink return system the prior art has used an ink separator as disclosed in Arway et al. U.S. Pat. No. 4,023,182, assigned to A. B. Dick Company, assignee of the present application. Interposing an ink/air separator between a catcher, ordinarily a part of the print head, and an ink return tank substantially increases the time period over which the ink formulation remains within acceptable operational limits. The separator, however, does not reduce the high rate of air flow in the catcher where ink is captured. Also, it is necessary to provide a mounting for the separator near the ink jet print head oriented suitably so that gravity can be utilized to separate the ink from the ink-air mixture entering the separator.

SUMMARY OF THE INVENTION

According to the present invention there is disclosed an apparatus for ink jet printing which includes a catcher having at its entryway a receptacle for intercepting unused ink droplets and a separate, air intake adjacent the receptacle to scavenge ink mist about the receptacle.

It is accordingly an object of the present invention to provide an apparatus for improved ink jet printing.

It is a further object of the present invention to provide a simplified apparatus for scavenging ink mist in the catcher area without mixing into a common stream the intercepted ink and the air flow that does the scavenging.

A further object of the present invention is to provide an ink catcher which substantially eliminates the exposure of intercepted ink to the air flow used to clean the catcher area of ink mist and ink build-up.

Another object of the present invention is to provide a catcher assembly in accordance with the above objects having a simplified structure which is not gravity dependent and which is easy to install.

Other objects and advantages of the invention will be apparent from the remaining portion of the specification.

BRIEF DESCRIPTION OF THE DRAWINGS

FIG. 1 is a schematic drawing of an ink jet apparatus employing the invention;

FIG. 2 is a perspective view of an ink catcher according to the present invention;

FIG. 3 is a side elevation of the catcher of FIG. 2;

FIG. 4 is a front elevation of the catcher of FIG. 2;

FIG. 5 is a plain view of the catcher of FIG. 2;

FIG. 6 is a section of the catcher of FIG. 2 taken along lines 6—6 in FIG. 5.

DETAILED DESCRIPTION

Figure 7:
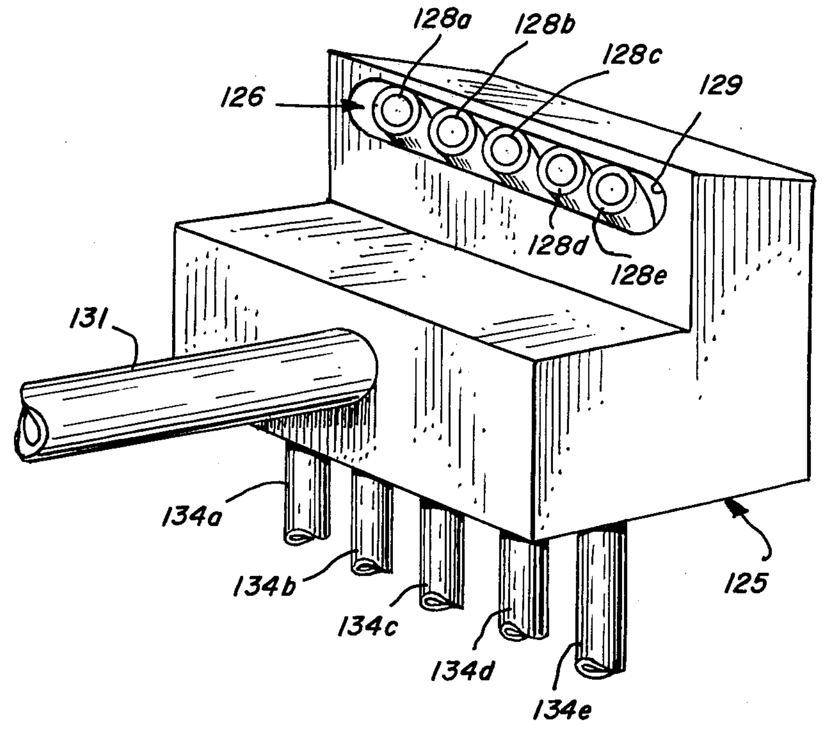
FIG. 7 is a perspective of an alternative embodiment of the present invention adapted to intercept a plurality of ink streams.

Referring to FIG. 1, a schematic of an ink jet printing system according to the invention is illustrated. The system utilizes ink which is stored in an ink supply tank 10 that is delivered by a supply line 11 to a nozzle assembly 12. To create pressure to force ink out of the nozzle 12 toward a print surface 14, a pump 15 and a regulator 16 are provided in the line 11. The nozzle assembly 12 has an orifice (not shown) at nozzle end 18 which commonly is of a small diameter, in one instance an orifice size of 0.0025 inches in diameter was used. The ink under pressure is projected initially as a continuous stream from the orifice toward the print surface 14 and subsequently it breaks up into individual droplets 19. To obtain uniform sized and regularly spaced droplets a controlled disturbance or perturbation may be introduced into the stream by using a technique well-known in the art of coupling a suitable driver to the nozzle assembly 12. One example of such a structure is an oscillator 20 coupled to a piezoelectric element (not shown) in the nozzle assembly. As exemplarily described, the flight or trajectory of the droplets is governed by controlling the electrical charge on each droplet by a charge ring 21 as the droplet is formed. The droplets pass through the charge ring 21 and enter an electrostatic field created by a set of deflection plates 22, 24. The electrostatic field is maintained at a constant level to provide a deflection field which determines the trajectory of the droplets in dependence on the charge level of each droplet as characterized by the action of charge ring 21. As exemplarily shown droplets which have a higher charge level follow a trajectory which causes them to strike the print surface 14 while droplets with a lower or substantially zero charge level are directed to a catcher 25.

In accordance with the present invention ink droplets which are directed to the catcher 25, once intercepted, are drawn away without exposure to air moving at a relatively high flow rate necessary for scavenging the ink particles and build-up which normally appears near the catcher. As herein illustrated that is accomplished by separating the flow path for the intercepted liquid ink from the flow path of the scavenging air. The catcher 25 has a common entryway or mouth 26 through which ink droplets in flight are directed and air is drawn in, including a receptacle or chamber 28 to capture ink drops and to direct the ink liquid along a separate path from the path of the scavenging air which flows through an air intake means or cowling 29. The air flow or conveyance is by way of the mouth or entryway 25 and is achieved by connecting a vacuum source 30 through a line 31 and vacuum regulator 32 to the cowling 29. The intake of air draws or pulls-in the ink particles, often times in a mist form, without affecting the ink droplets directed either to the print surface 14, or an entrance of the receptacle 28, which maintain their direction due to inertia. To prevent ink build-up at the entrance of the receptacle 28, as herein illustrated, the same vacuum source 30 is utilized. It is connected through a regulator 35, an ink return tank 36 and a return tube 34 to the receptacle 28, shown in the exemplary embodiment of FIGS. 2–6 as a duct, the return tube and receptacle serving as a conveyor to define a flow path for the ink liquid. Of course, the vacuum source connected to tube 34 can be separate from that connected to line 31 if that is a more convenient arrangement. The ink liquid which is captured by receptacle 28 is withdrawn through the tube 34 and received in the ink return tank 36. Instead of using a vacuum source to draw ink through tube 34, a pump 37 shown in phantom in FIG. 1 could be employed for that purpose. It is also noted that as exemplarily shown, a liquid flow connection 33 is shown between the ink return reservoir 36 and ink supply reservoir 10. Though not shown, a suitable pump and check valve would be provided in-line between the reservoirs as the transfer mechanism by which to move ink out of the vacuum environment of the ink return tank into the pressure environment of the ink supply tank.

One of the features of the present invention is that the rate of air flow at the catcher mouth 26 is maintained at a relatively higher rate than is the air flow in the receptacle 28 and ink return tube 34. The vacuum regulators 32 and 35, respectively are adjusted so that while the vacuum source 30 is common to both a relatively higher rate of air flow is maintained in line 31 than is maintained in tube 34. It has been found that an air flow rate of approximately 8 Standard Cubic Feet per Hour (SCFH) at the mouth 26 is sufficient to sweep or scavenge the mouth area of ink mist. It also has been found that build-up of ink at the receptacle 28 can be prevented by maintaining an air flow in tube 34 of about 1 SCFH.

In one practical instance, to maintain the desired relatively lower air flow rate in the return receptable 28 as compared to the air flow rate in the cowling 29, the tube 34 had a diameter of 0.062 inches while the tube for line 31 had a diameter of 0.125 inches. The form, shape and orientation of the receptacle, cowling and associated catcher elements and tubing connections of such exemplary structure are shown in FIGS. 2–6. The regulators 35 and 32 were set to maintain an air flow through the cowling at about 10 SCFH and through the ink receptacle at about 1 SCFH. Those air flow rates assured that ink mist was effectively ingested at the catcher entryway or mouth 26 so it did not deposit on the electrical components such as the deflection plates 22 and 24 nor onto the print surface 14. At the same time the ink liquid was captured by the receptacle 28 and withdrawn into the ink return tank 36 with a minimum of exposure to air flowing at higher rates. Using an exemplary alcohol based ink it was found that an evaporation rate of 47 hours per quart was achieved. This is a substantial improvement over prior art systems which achieved, with comparable inks, rates of 37 hours per quart.

The catcher, receptacle and air intake means may take different forms while accomplishing their purpose of catching ink droplets not used for printing and sweeping the ink mist from the catcher area while minimizing the exposure of the captured ink to higher rates of air flow. For example, the air intake means may be either adjacent to the liquid ink receptacle or contain the receptacle.

Another alternative embodiment of the catcher is shown in FIG. 7. Turning to FIG. 7, thereshown is a catcher 125 having an entryway 125 adapted to receive ink droplets directed from a plurality of ink streams and through which a flow of air is maintained to scavenge the ink mist in the area. The droplets are received or intercepted by a receptacle comprised of individual tube openings **128*a*–128*e*, as exemplarily shown, one tube opening provided for each ink stream. The receptacle could also take the form of an elongated trough for intercepting all the streams through a common opening. A cowling 129 of complementary shape to contain the receptacle, herein shown as elongated, is provided in proximity to the receptacle tube openings 128*a*–128*e*. Similar to the description of the printing systems of FIGS. 1–6, the receptacle tube openings 128*a*–128*e* are individually connected to a set of lower rate air flow ink return tubes 134*a*–134*e* while the cowling 129 is connected to a higher rate air flow line 131. Each of the tubes 134*a*–134*e* and the line 131 are connected to a vacuum system including a vacuum source and regulators as in the earlier described printing system. The catcher 125** would find practical application in an ink jet printing system which utilizes a plurality of orifices to create multiple ink streams.

The present invention has been found to greatly simplify the construction of an ink catcher while achieving substantially complete isolation of the return ink from the high rates of air flow necessary for scavenging ink mist from the catcher area. Ink jet printing systems in which the present invention is used can be relieved of the restraints on orientation of the catcher and connecting lines of some prior art structures. These are the gravity non-dependent versions of the invention, which are exemplified by the system having the vacuum source or the pump in tube 34 to draw ink from the receptacle entrance 28. The present invention, however, may use gravity to carry ink away from the receptacle entrance if the ink has suitable flowing properties. While the invention has been illustrated in an ink jet printing system with a specific droplet control technique, it can be applied in other ink jet printing structures where ink is directed into a catcher and it is desirable to minimize the loss of solvent from the ink. Also, though specific forms of the ink catcher have been illustrated, other shapes of the receptacle and cowling may be used within the spirit and objectives of the present invention.

While we have shown and described embodiments of this invention in some detail, it will be understood that this description and illustrations are offered merely by way of example, and that the invention is to be limited in scope only by the appended claims.

What we claim is:

1. In an ink jet printing apparatus including an assembly for projecting a liquid ink stream toward a surface, a portion of such ink stream being used to mark the surface and the remainder being carried away, the combination comprising:

a vacuum source for providing a predetermined level of air flow, a catcher having a common entryway through which the remainder of the ink stream not used in marking the surface is directed and air is drawn, said catcher including receptacle means having an entrance to intercept the stream directed thereto and a liquid conveyor to carry away the intercepted ink liquid along a first flow path and an air intake means positioned adjacent to said receptacle means and having a second flow path separate from said first flow path and connected to said vacuum source to maintain air flow in proximity to said receptacle to sweep ink particles away from said receptacle entrance.

2. The combination of claim 1 wherein said receptacle is connected to a vacuum source and means for selecting the vacuum level applied to said receptacle and to said air intake means, respectively, to establish a minimal air flow at said receptacle entrance sufficient to draw liquid ink along said receptacle flow path and a relatively higher air flow at said air intake means sufficient to sweep ink particles away from the catcher entryway.

3. The combination of claim 2 wherein said air flow in said receptacle is of the order of 1 SCFH or less and said air flow in said air intake means is of the order of 8 SCFH or greater.

4. The combination of claim 1 wherein said air intake means contains said ink liquid receptacle.

5. The combination of claim 1 wherein a plurality of ink streams are directed to said catcher and said receptacle entrance having an area extending across the pattern of said plurality of streams to intercept such streams.

6. The combination of claim 5 wherein said receptacle is comprised of openings in individual tubes, each opening positioned to receive a respective one of said plurality of ink streams and said air intake means enveloping said plurality of tube openings.

* * * * *